United States Patent
Becker et al.

(10) Patent No.: US 7,050,826 B2
(45) Date of Patent: May 23, 2006

(54) HARDWARE STRUCTURE FOR A TRANSMISSION/RECEPTION DEVICE FOR MOBILE RADIO APPLICATIONS, AND METHOD FOR PROCESSING DATA IN SUCH A TRANSMISSION/RECEPTION DEVICE

(75) Inventors: Burkhard Becker, Ismaning (DE); Thuyen Le, München (DE)

(73) Assignee: Infineon Technologies AG, Munich (DE)

(*) Notice: Subject to any disclaimer, the term of this patent is extended or adjusted under 35 U.S.C. 154(b) by 206 days.

(21) Appl. No.: 10/832,675

(22) Filed: Apr. 27, 2004

(65) Prior Publication Data
US 2004/0250049 A1 Dec. 9, 2004

Related U.S. Application Data

(63) Continuation of application No. PCT/DE02/03657, filed on Sep. 26, 2002.

(30) Foreign Application Priority Data
Oct. 31, 2001 (DE) ............................... 101 53 767

(51) Int. Cl.
*H04M 1/00* (2006.01)
*G06F 15/00* (2006.01)

(52) U.S. Cl. ................. 455/550.1; 455/73; 455/553.1; 455/130; 712/1; 712/200; 712/208

(58) Field of Classification Search ............. 455/550.1, 455/73, 553.1, 130; 712/1, 200, 208, 203
See application file for complete search history.

(56) References Cited

U.S. PATENT DOCUMENTS

| | | | |
|---|---|---|---|
| 6,154,788 A * | 11/2000 | Robinson et al. ............... 710/8 |
| 6,308,255 B1 * | 10/2001 | Gorishek et al. ........... 712/209 |
| 6,650,694 B1 * | 11/2003 | Brown et al. ................ 375/150 |
| 6,941,112 B1 * | 9/2005 | Hasegawa ..................... 455/69 |
| 2001/0019592 A1 * | 9/2001 | Slondz ........................ 375/267 |

FOREIGN PATENT DOCUMENTS

| | | |
|---|---|---|
| DE | 691 24 196 T2 | 5/1997 |
| EP | 0 789 882 B1 | 7/1996 |
| EP | 0 935 204 A2 | 2/1999 |
| WO | WO00/69084 | 5/2000 |

\* cited by examiner

*Primary Examiner*—Sonny Trinh
*Assistant Examiner*—Huy Phan
(74) *Attorney, Agent, or Firm*—Baker Botts L.L.P.

(57) ABSTRACT

A transmission/reception device for mobile radio applications has a microprocessor (DSP), at least one task-specific processor (P1, P2, P3) and a processor interface (2). The task-specific processor (P1, P2, P3) can be configured, by transmitting suitable configuration instructions from the microprocessor via the processor interface (2), such that a basic function performed by the task-specific processor (P1, P2, P3) can be controlled by changing configuration parameters.

14 Claims, 3 Drawing Sheets

RAKE data processing circuit
| Finger No | ena | deloff | sc_no | sc_off | ch_no | sf | mrc_no |
|---|---|---|---|---|---|---|---|
| 1 | | | | | | | |
| 2 | | | | | | | |
| ⋮ | ⋮ | ⋮ | ⋮ | ⋮ | ⋮ | ⋮ | ⋮ |
| | | | | | | | |
Fig. 3
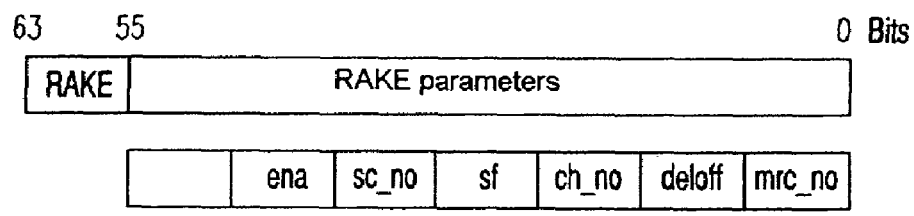
Fig. 4a
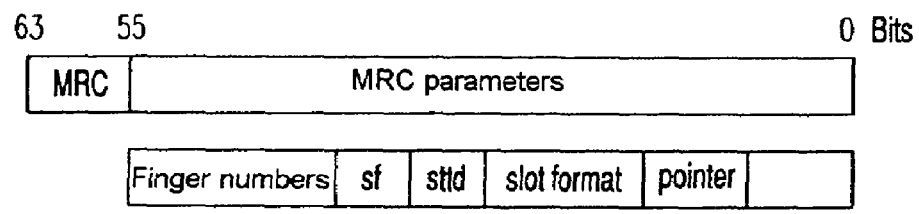
Fig. 4b

HARDWARE STRUCTURE FOR A TRANSMISSION/RECEPTION DEVICE FOR MOBILE RADIO APPLICATIONS, AND METHOD FOR PROCESSING DATA IN SUCH A TRANSMISSION/RECEPTION DEVICE

CROSS REFERENCE TO RELATED APPLICATION

This application is a continuation of copending International Application No. PCT/DE02/03657 filed Sep. 26, 2002 which designates the United States, and claims priority to German application no. 101 53 767.0 filed Oct. 31, 2001.

TECHNICAL FIELD OF THE INVENTION

The present invention generally relates to a transmission/reception device for mobile radio applications, particularly for a third or higher generation mobile station, and also to a method for processing data in such a transmission/reception device.

DESCRIPTION OF RELATED ART AND BACKGROUND OF THE INVENTION

In mobile radio transmission/reception devices, the hardware architecture takes on an important role, since it influences critical parameters such as power consumption and data processing speed to a great extent. Modem mobile radio transceivers always comprise a microprocessor, usually a digital signal processor (DSP), which plays a central role in data processing tasks, such as equalization and channel decoding.

In principle, it is possible for all of the equalization of the received data to be performed solely using a DSP operated with appropriate software. However, this solution, which is the easiest imaginable in terms of hardware architecture, has a series of drawbacks. In particular, it is necessary to use very powerful and hence expensive DSPs in order to ensure the required signal processing speed. Furthermore, such DSPs have a power consumption which is unacceptably high for mobile stations.

To reduce the power consumption and the MIPS (Million Instructions Per Second) load in the microprocessor or DSP, processor or DSP tasks are transferred to specific hardware peripherals. By way of example, it is already known practice to provide support for the execution of the ACD (Add Compare Select) step in Viterbi equalization or Viterbi decoding using suitable hardware data paths. These calculate particular, ever recurrent computation tasks and thus relieve the burden on the DSP. One drawback, however, is that the use of such hardware peripherals greatly restricts the flexibility of the data processing. The attendant difficulties become more acute in higher generation mobile radio systems, which require flexible service and data administration management.

In data processor technology, it is generally known practice to provide support for user programmable processors by providing task-specific coprocessors. The coprocessor undertakes the execution of complicated operations which would be a great burden on the processor. The best known types are arithmetic coprocessors for performing the four basic types of computation and possibly transcendental functions, and also graphics coprocessors. In this case, data interchange between the processor and the coprocessor takes place via a coprocessor interface.

European patent specification EP 0 789 882 B1 describes a multimedia processor architecture in which a user programmable processor has a plurality of task-specific processors with a high power density connected in parallel with it. The task-specific processors are either nonprogrammable or have a low level of programmability, i.e. their behavior can be altered by prescribing parameters. The low level of programmability allows these processors to be used in respective different algorithms, where the same basic functions are performed, but with different parameter values. Parameter values for a particular algorithm are typically updated—i.e. the task-specific processor is configured—at a much lower speed than the data processing speed. Parameters can be reloaded using a separate bus.

SUMMARY OF THE INVENTION

The invention is based on the object of providing a transmission/reception device having a hardware architecture which is advantageous for mobile radio applications. In particular, the architecture is intended to allow adequate flexibility for the data processing while ensuring the strict requirements in terms of power consumption and processing speed. In addition, it is an aim of the invention to provide a data processing method for mobile radio applications which meets these criteria.

The object can be achieved by a transmission/reception device for mobile radio applications, particularly for a third or higher generation mobile station, comprising a microprocessor, a plurality of task-specific processors, wherein each task-specific processor can be configured such that a basic function performed by the task-specific processor can be controlled by changing configuration parameters, where, following configuration, the task-specific processor performs data processing in line with a function determined by the configuration, a bidirectional processor interface which connects the microprocessor and the plurality of task-specific processors to one another via a first bus, wherein the first bus connects the processor interface associated with the microprocessor with the task-specific processors, and a second bus, which connects the microprocessor and at least one of the task-specific processors to one another for the purpose of data interchange, wherein the microprocessor has an associated configuration table and the entries in the configuration table comprise control data which are calculated beforehand in a task-specific processor and are transferred to the microprocessor via the processor interface, the microprocessor ascertains the configuration instructions for a task-specific processor by evaluating the control data in the configuration table, the microprocessor is designed to configure the task-specific processors by transmitting suitable configuration instructions via the processor interface, and the first bus is provided for transferring the configuration instructions and the control data.

The second bus may connect the microprocessor, the plurality of task-specific processors and also at least one data storage means in the transmission/reception device to one another for the purpose of data interchange. Further hardware modules and/or external interfaces for the transmission/reception device can be connected to the second bus. The plurality of task-specific processors can be connected to the second bus via a configurable interface, and a configuration instruction transferred via the processor interface by the microprocessor can be used to assign the configurable interface to a particular task-specific processor or to a submodule thereof. A first task-specific processor can be a RAKE data processing circuit. The configuration parameters for the RAKE data processing circuit may comprise one or more of the following parameters: operating state of a RAKE finger, delay offset of a RAKE finger, scrambling code identifier for a RAKE finger, delay offset of the scrambling code for a RAKE finger, spreading code identifier for a RAKE finger, and spreading factor for a RAKE finger. A second task-specific processor can be a searcher. Control data provided by the searcher may comprise one or more of the following parameters: levels of the ascertained signal peaks, delay offsets of the ascertained signal peaks, and cell identifiers of the ascertained signal peaks.

The object can also be solved by a method for processing data in a transmission/reception device for mobile radio applications, particularly for a third or higher generation mobile station, comprising a microprocessor, a plurality of task-specific processors, wherein each task-specific processor can be configured such that a basic function performed by the task-specific processor can be controlled by changing configuration parameters, and a bidirectional processor interface which connects the microprocessor to the task-specific processor, comprising the steps of: ascertaining the configuration parameters for a task-specific processor by evaluating control data which have been calculated beforehand in another task-specific processor and have been communicated to the microprocessor, transmitting the configuration instructions and/or control data via a first bus to one task-specific processor, the first bus connecting the processor interface associated with the microprocessor to each task-specific processor, configuring one task-specific processor by transmitting suitable configuration instructions from the microprocessor to one task-specific processor via the processor interface, following configuration of one task-specific processor, instructing the latter to process data in line with a function determined by the configuration, and transmitting further data to be processed from one task-specific processor using a separate second bus, which connects the microprocessor and at least one of the task-specific processors to one another for the purpose of data interchange.

A first task-specific processor can be a RAKE data processing circuit, and the configuration step may comprise the prescription of one or more of the following parameters: operating state of a RAKE finger, delay offset of a RAKE finger, scrambling code identifier for a RAKE finger, delay offset of the scrambling code for a RAKE finger, spreading code identifier for a RAKE finger, and spreading factor for a RAKE finger. A second task-specific processor can be a searcher, and may comprise the following step: control data from the searcher are transmitted to the microprocessor, said control data comprising one or more of the following parameters: levels of the ascertained signal peaks, delay offsets of the ascertained signal peaks, and cell identifiers of the ascertained signal peaks. Data can be processed in a task-specific processor following configuration thereof using a multiplicity of cycles, particularly using a multiplicity of timeslots or timeframes when taking a transmission system with a timeslot and/or timeframe structure as a basis.

Accordingly, a transmission/reception device in line with the invention comprises a microprocessor and at least one task-specific processor which is configurable. Configurable means that a basic functions which can be performed by the task-specific processor can be controlled by changing configuration parameters, with, following configuration, the task-specific processor performing data processing in line with a function determined by the configuration. The communication between the microprocessor and the task-specific processor takes place via a processor interface. In this case, the microprocessor is designed to configure the task-specific processor by transmitting suitable configuration instructions via the processor interface.

The configurability of the task-specific processor allows flexible data processing in relation to the basic function which is to be executed by the task-specific processor. Since, following configuration, the task-specific processor is able to perform independent data processing in line with a function determined by the configuration, it has the high processing speed which is typical of hardware chips. In comparison with software based program execution, the inventive hardware structure also normally has a lower power consumption.

Preferably, the transmission/reception device comprises a plurality of task-specific processors which can be configured in this manner. This allows various data processing tasks to be handled flexibly in the receiver or transmitter. In this case, the microprocessor preferably takes pure administration tasks, i.e. reads result data for the task-specific processors and then configures the latter in a suitable manner.

Preferably, the microprocessor has an associated configuration table which contains, by way of example, the current configurations (configuration parameters) for one or more of the task-specific processors. If it is necessary to reconfigure a task-specific processor as a result of particular influencing variables (e.g. user action, change of operating state, selection of a different mobile radio standard for multistandard receivers), then the configuration instructions required for this are preferably ascertained by evaluating the entries in the configuration table.

Reconfiguration of a task-specific processor may also be initiated and performed as a result of or on the basis of a previous reconfiguration of another task-specific processor or on the basis of ascertained result data therefor. For this reason, the entries in the configuration table preferably also include entries which have been calculated beforehand in another task-specific processor and have been transferred to the microprocessor via the processor interface. This means that the configuration table is always kept up to date.

One particularly preferred embodiment of the invention is characterized in that there is a first bus for connecting the processor interface associated with the microprocessor to the at least one task-specific processor, and in that there is also a second bus which connects the microprocessor, the at least one task-specific processor and also at least one data storage means in the transmission/reception device to one another for the purpose of data interchange. In particular, further hardware modules and/or external interfaces for the transmission/reception device are connected to the second bus.

The effect achieved by this two bus structure is that the interchange of control data and configuration instructions and also possibly of further data where timing is critical takes place via a separate bus (first bus) and is thus independent of the data traffic via the second bus. For this reason, it is also possible to ensure smooth interchange of administration information (control data, configuration instructions) between the microprocessor and the task-specific processors even when the second bus is subject to a high traffic load.

If there are a plurality of configurable, task-specific processors, one advantageous embodiment of the invention is characterized in that the plurality of task-specific processors can be connected to the second bus via a configurable interface, and in that a configuration instruction transferred via the processor interface by the microprocessor can be used to assign the configurable interface to a particular task-specific processor. Processing data are then transferred from or to the microprocessor exclusively via the second bus, the first bus being reserved for interchanging administration information.

The task-specific processors can undertake many diverse tasks. One particularly preferred variant embodiment is characterized in that a first task-specific processor is a RAKE data processing circuit. Expediently, the configuration parameters for the RAKE data processing circuit comprise one or more of the following parameters: operating state of a RAKE finger, delay offset (i.e. delay time) of a RAKE finger, scrambling code identifier for a RAKE finger, delay offset of the scrambling code for a RAKE finger, spreading code identifier for a RAKE finger, and spreading factor for a RAKE finger. This set of configuration parameters allows the desired flexibility for the RAKE data processing circuit in terms of different algorithmic data processing cycles.

A further advantageous variant of the inventive transmission/reception device is characterized in that a second task-specific processor is a searcher (i.e. a search device). The task of a searcher in a mobile radio transceiver is to provide the information which is required for signal acquisition and for synchronizing the RAKE fingers. Accordingly, the control data provided by the searcher comprise one or more of the following parameters: levels of the ascertained signal peaks, delay offsets of the ascertained signal peaks, and cell identifiers for the ascertained signal peaks.

In the case of the inventive method, one particularly advantageous variant embodiment is characterized in that data are processed in a task-specific processor following configuration thereof using a multiplicity of cycles, particularly using a multiplicity of timeslots or timeframes when taking a transmission system with a timeslot and/or timeframe structure as a basis.

BRIEF DESCRIPTION OF THE DRAWINGS

The invention is explained below by way of example with reference to the drawing, in which:

FIG. 3 shows a simplified illustration of an extract from a configuration table for storing administration information for a task-specific processor;

FIG. 4a shows an example of a data word for configuring a task-specific processor in the form of a RAKE data processing circuit;

FIG. 4b shows an example of a data word for configuring a RAKE finger combination stage in the RAKE data processing circuit.

DETAILED DESCRIPTION OF EMBODIMENTS

Figure 1:
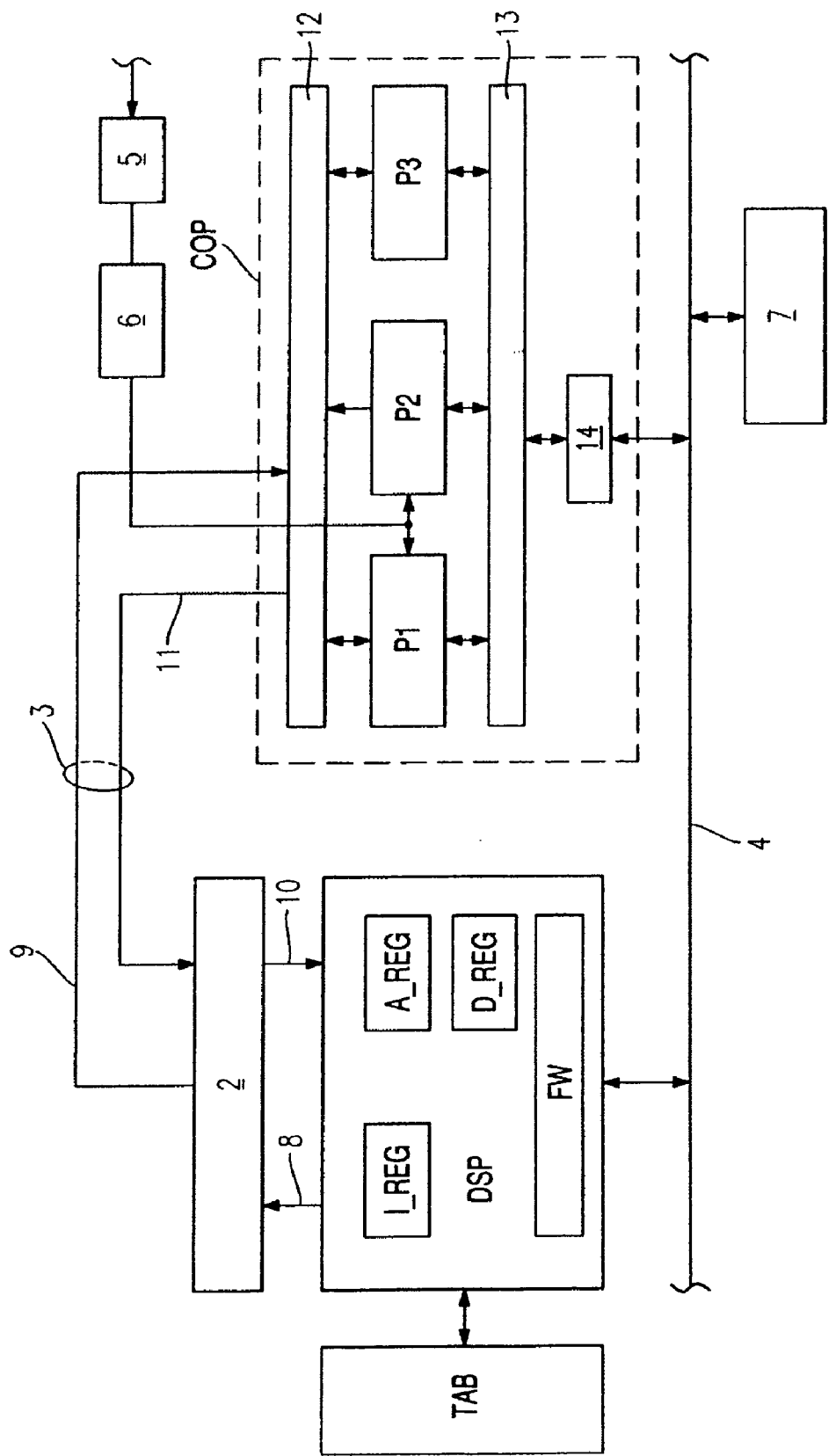
FIG. 1 shows a simplified block diagram of the hardware architecture of an exemplary embodiment of a transmission/reception device in accordance with the invention.

FIG. 1 shows a block diagram of the hardware architecture of an exemplary embodiment of the invention. The transmission/reception device comprises a microprocessor, e.g. in the form of a digital signal processor DSP, which is connected to a coprocessor COP via a coprocessor interface 2 and a first bus 3. A further data connection between the DSP and the coprocessor COP is provided via a second bus 4. The second bus 4 is normally connected to a multiplicity of other peripheral modules (not shown) associated with the transmission/reception device, which peripheral modules may be of different types depending on the design of the mobile radio transceiver. In addition, the second bus 4 may, by way of example, also be connected to a device interface for external supplementary devices, e.g. an infrared interface (not shown). A data store 7 allows data which are transferred via the second bus 4 to be buffered or temporarily stored.

FIG. 1 also shows a simplified illustration of the analog/digital interface for the reception path (analog/digital converter) 5 and a downstream peripheral module 6 which processes the digitized received data. The peripheral module 6 may be, by way of example, a baseband filter, or other data processing modules provided in the reception signal path. The received data may in this case be fed directly into some of the task-specific processors P1 and P2 (e.g. RAKE and searcher, as explained in more detail later).

The DSP comprises program code (FW: firmware), which is normally stored in a ROM. In addition, the DSP contains, in line with the normal design, an address register A_REG, a data register D_REG and an instruction register I_REG.

The data interchange and the synchronization with the coprocessor COP take place via the coprocessor interface 2. For this purpose, the instruction register I_REG contains specific instructions which address the coprocessor COP directly. These instructions are transmitted from the DSP to coprocessor COP via the unidirectional data links 8 and 9. In addition the DSP can use the data links 10 and 11 to obtain data from the coprocessor COP with the cooperation of the coprocessor interface 2. The data links 10 and 11 may also be of bi-directional design, if appropriate. In addition, the DSP is connected to a table store TAB.

The coprocessor COP comprises a plurality of configurable, task-specific processors P1, P2 and P3 (there may be further task-specific processors P4, P5, . . . (not shown)) which are connected to the first bus 3 (data links 9 and 11) via a common first interface 12. In addition, the task-specific configurable processors P1, P2 and P3 are linked to the second bus 4 via a second interface 13 and a register 14.

The task-specific, configurable processors P1, P2 and P3 are hardware modules performing particular basic functions typical of transmitters or receivers. By way of example, the processor P1 performs RAKE data processing, the processor P2 performs data processing for a searcher, and the processor P3 performs coding data processing. It is also possible for one or more further task-specific processors P4, P5 (not shown) to contain a coding, spreading and interleaving unit and also a modulation unit in the transmission direction. The processors P1 to P3 are not user programmable but rather are in the form of a parameterizable sequential logic circuit. That is to say that, depending on the design, each of the processors P1, P2 and P3 processes data in line with a particular basic function which is prescribed by the circuit design, but this basic function can be controlled and altered by prescribing different parameter values. This flexible configurability of the processors P1, P2 and P3 ensures that the functionality of the coprocessor COP can be aligned with different requirements (services, standards, channel conditions etc.).

In line with the invention, the coprocessor COP is monitored and configured using an exclusive link (coprocessor interface 2 and bus 3) which can be accessed by no other units. This guarantees that the bus 3 is continually available and decouples the administration of the coprocessor from the data traffic on the bus 4, which is used to transfer the actual processing data (e.g. non-time-critical results of the data processing in the task-specific processors) and which cannot ensure continual availability on account of it being linked to further modules.

Time-critical results of the data processing in the task-specific processors P1, P2, P3 are, in contrast, transferred via the bus 3 and the interface 2. The requesting of control data and the configuration of the application-specific processors P1, P2 and P3 in the coprocessor COP via the bus 3 and the interface 2 are explained in more detail below with reference to an example.

Signal acquisition in the UMTS (Universal Mobile Telecommunications System) standard involves a first synchronization channel (PSCH: primary synchronization channel) on the downlink first being used to perform timeslot synchronization, and then a modulated second synchronization channel (sSCH: secondary synchronization channel) being used to perform frame synchronization. Subsequently, the receiver knows the identity of the base station having the strongest transmitted signal and also the timeslot and frame structure used by this base station.

The synchronization codes transmitted via the pSCH and sSCH channels are detected by means of correlation signal processing by the searcher (processor P2). The DSP subsequently reads control data relating thereto from the processor P2 and stores these data in suitable memory areas in the table store TAB.

Following timeslot and frame synchronization, the DSP instructs the searcher P2 to record delay profiles for the various received channels. A delay profile represents the time characteristic of a received signal, said time characteristic being made up, on account of the multipath propagation, of the signal's path contributions arriving at different times.

Figure 2:
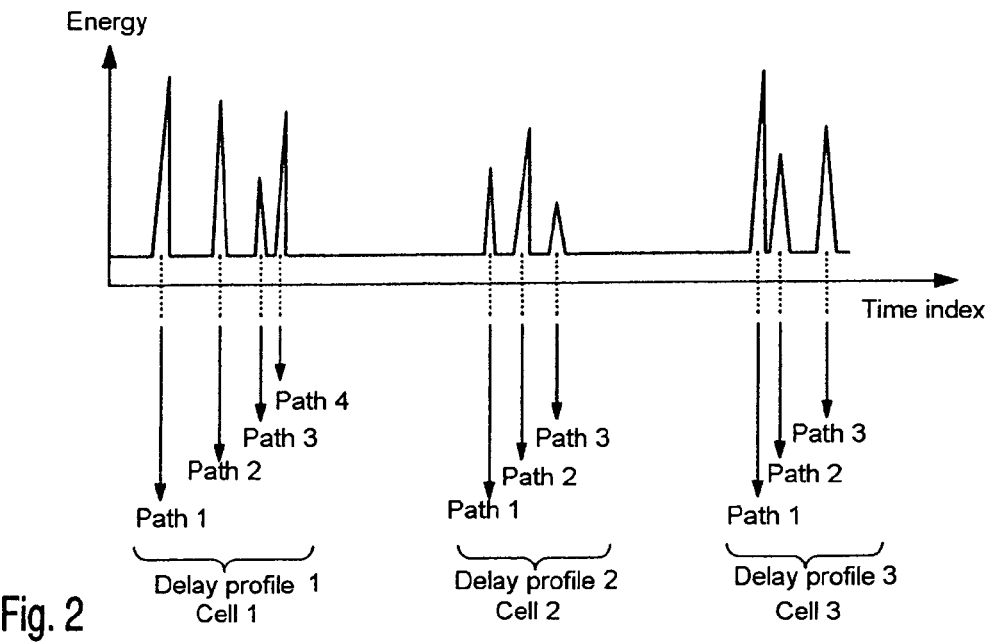
FIG. 2 shows a graph plotting the channel energy against the time index.

FIG. 2 shows the delay profiles which are obtained for three different mobile radio cells, e.g. from the dedicated pilot signals with the cell-specific scrambling codes.

When the delay profiles have been ascertained in the searcher P2, the DSP reads the following control data from the searcher P2:

level of each ascertained signal peak (path energy), delay offset of each ascertained signal peak (at the start of the timeslot, which has since become known), i.e. path delay, cell identifier for each ascertained signal peak; the cell identifier identifies the cell to which the path which has been found belongs. The cell identifier is already known from the frame synchronization and from the ascertainment of the cell-specific scrambling code.

These details are likewise stored in a suitable memory area in the table store TAB.

Using these control data and possibly further information, the DSP subsequently configures the RAKE data processing circuit (i.e. the processor P1). A table showing the configuration parameters for the RAKE data processing circuit P1 is shown in FIG. 3. This table is likewise stored in the table store TAB and is administered by the DSP.

The columns in the table contain the following details: RAKE finger number, operating state of the RAKE finger (ena: enabled or disabled), delay offset of the RAKE finger (deloff), scrambling code identifier of the RAKE finger (sc_no), delay offset of the scrambling code of the RAKE finger (sc_off), spreading code identifier of the RAKE finger (ch_no), spreading factor of the RAKE finger (sf), and an ID number for the finger combination stage in the RAKE, which is called the MRC (maximum ratio combiner) (mrc_no).

In this case, the MRC ID number mrc_no indicates the relationship between the finger and the channel detected by this finger, for example mrc_no=1 for the DPCH channel, mrc_no=2, for the DSCH channel, etc.

This allows the MRC to combine the respective fingers associated with the same channel.

The task of the DSP is now to use the available information to assign the available RAKE fingers, as required, to the ascertained path contributions and channels which need to be detected. The assignment may depend on a multiplicity of circumstances, e.g. task to be performed (e.g. synchronization), signal strength distribution in the delay profile (gives the number of paths needed) etc. This administration task is performed under the control of the DSP internal program FW and results in the current entries for the table shown in FIG. 3.

Next, it is down to the DSP to program or configure the RAKE data processing circuit (processor P1). The programming is performed using instruction words which are supplied to the appropriate processor (in this case P1) via the unidirectional data links 8 and 9. FIGS. 4a and 4b show one possible structure for such instruction words.

The instruction word shown in FIG. 4a for configuring the processor P1 comprises, by way of example, 64 bits. The leading 8 bits (63 to 56) identify the RAKE data processing circuit P1 as the destination unit for the instruction word. In this case, the RAKE finger to be configured is likewise identified. 56 bits (55 to 0) are available for parameterizing the desired configuration of this finger. The corresponding information ena, sc_no, sf, ch_no, deloff and mrc_no are taken from the table shown in FIG. 3 and are stored in identical fields of suitable size in the instruction word.

FIG. 4b shows the structure of an instruction word for configuring the MRC. The latter is likewise held in the RAKE data processing circuit P1 and, just like a RAKE finger, is addressed by the first eight bits (MRC) of the instruction word.

The next field (finger numbers) indicates which RAKE fingers need to be combined by the MRC. The spreading factor (sf) which is common to these fingers is indicated in the next field. The field "sttd" (space time transmit diversity) indicates the number of antennas used at the transmitter end, i.e. determines the transmitter-end antenna diversity. The field "slot format" allows various data formats to be prescribed for data interchange. The field "pointer" sets the pointer for reading individual local memories in the RAKE fingers to the addresses which correspond to one another.

The MRC is configured using the instruction words shown in FIG. 4b. The data for all of the channels or cells which are to be detected (see FIG. 2) are then combined without any interaction with the DSP.

The DSP is also able to configure the second interface 13 such that it preselects a particular processor P1, P2 or P3, which means that the data calculated by this processor are routed to the second bus 4 via the register 14. A peripheral module (or the DSP itself) wishing to obtain processing data from the coprocessor COP can then effect read access to the register 14 using the same address every time (the address of the register 14). The configuration of the second interface 13 ensures that the processed data which are output by the register 14 in the manner of a FIFO always come from the "correct" task-specific processor P1, P2 or P3 or from a submodule.

Figure 5:
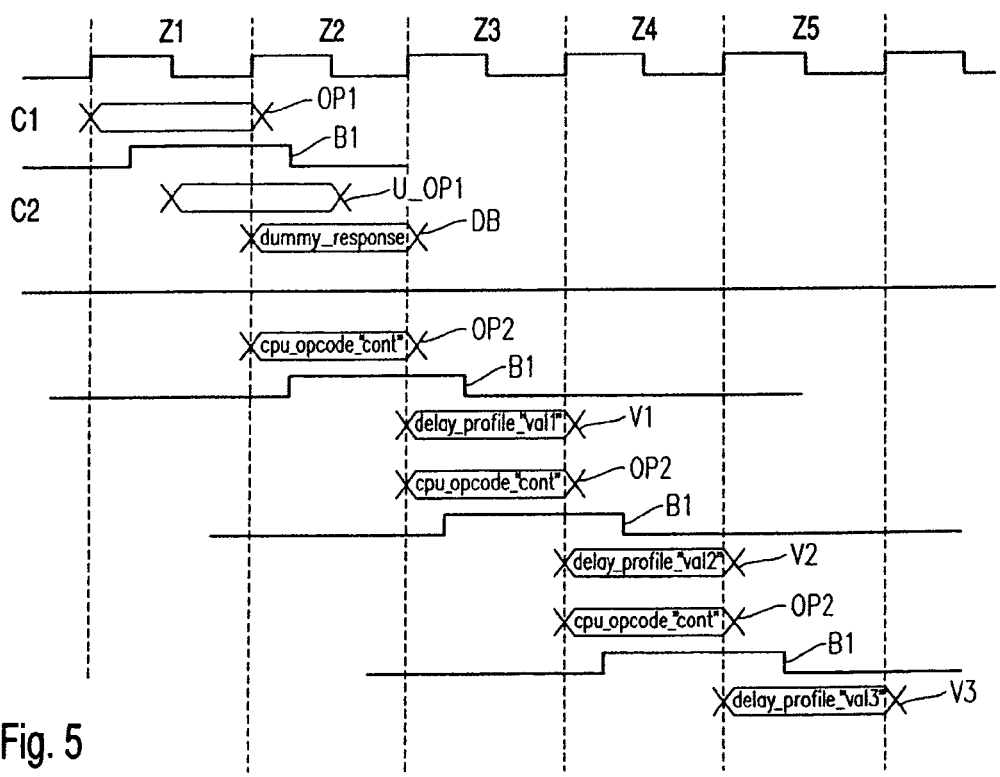
FIG. 5 shows an example of an instruction sequence which is used to explain the timing for reading control data from a searcher via the processor interface.

FIG. 5 shows the timing when the delay profiles are read from the search P2, as an example of the communication between the microprocessor DSP and the coprocessor COP. In this case, the top rectangular line represents the machine cycles in the DSP.

In a first configuration step C1, the DSP uses a suitable instruction word OP1 to notify the coprocessor COP, in cycle Z1, that a delay profile needs to be read from the processor P2 (searcher). The searcher P2 acknowledges receipt of the instruction word by means of an acknowledgement B1. In the same cycle Z1, the DSP can transfer a subinstruction word U_OP1 in order to notify the searcher P2 of that part of the delay spectrum for which the control data (levels, delay offsets and cell identifiers of the signal peaks) need to be read (for example the delays associated with one or more particular delay profiles or the delays associated with a particular time window). This configuration step is denoted by C2. Receipt of the subinstruction word U_OP1 can be answered by an acknowledgement from the coprocessor COP. Such an acknowledgement is not necessary when configuring the coprocessor, however, i.e. the DSP can also be prevented from interrupting its activity by otherwise generating a dummy response DB in the next cycle Z2.

Following configuration of the searcher P2, control data—in this case signal levels, time indices and cell identifiers of delay values—are read using a single instruction word OP2 transferred from the DSP to the searcher P2. The instruction OP2 ("continue") relates to the previous configuration of the searcher P2 and notifies the latter that, upon receipt of each instruction word OP2, a further delay value needs to be read from the searcher P2 and transferred to the DSP.

While no reconfiguration is taking place, the DSP is notified of a delay value V1, V2 or V3 (which is desired in accordance with the configuration) via the coprocessor interface 2 and the data links 10 and 11 by repeatedly polling the searcher P2 using the instruction words OP2 in the cycles Z2, Z3 and Z4, always in the respective subsequent cycles Z3, Z4 and Z5. Acknowledgement of the read instructions OP2 received (via the coprocessor interface 2 and the data links 8 and 9) is respectively denoted by the reference symbol B1 in FIG. 5.

The RAKE data processing circuit P1 can be configured in a similar manner; in this case, the subinstruction words U_OP1 shown in FIG. 5 correspond to the RAKE or MRC configuration instructions shown in FIGS. 4a and 4b. The first configuration instruction word, which corresponds to the configuration instruction word OP1 (and which communicates that the RAKE data processing circuit P1 needs to be configured by writing in parameters), configures the task-specific processor P1 in advance in order to decode the subinstruction words received subsequently (correspond to U_OP1).

In general, the communication between the DSP and the coprocessor COP thus involves transfer of a coprocessor hardware-specific code (instruction words, subinstruction words) notifying the coprocessor hardware of the use of subsequently interchanged configuration data. "Time-critical highly compressed result data", referred to as control data above, are read from the processors P1, P2 and P3 in the same way, as explained. Both the programming using configuration parameters and the reading of the control data take place via the exclusive bus 3. The processor DSP preferably takes no part at all in the algorithmic processing of raw or preprocessed received data, but rather, as described, performs only administration tasks ("scheduling") for instructing and monitoring the coprocessor COP. Following configuration, the latter normally performs independent processing of processing data, which are interchanged via the bus 4, over a multiplicity of timeframes up to the next reconfiguration operation.

The abovedescribed tasks of the processors P1 to P3 are exemplary in nature. Besides the described demodulation of data and control channels, the delay estimation including timeslot and frame synchronization, processors may also be provided for the purpose of taking performance measurements, for the purpose of demodulating specifically pilot symbols for channel estimation, for the purpose of channel estimation, for the purpose of SINR calculation and for the purpose of further processing tasks typical of receivers. Similarly, task-specific processors may be provided for transmission tasks.

In summary, it can be stated that the inventive hardware architecture allows flexible, task-specific data processing, meeting practical requirements, in a mobile radio transceiver, with the configurable, task-specific processors P1, P2 and P3 making it possible to ensure a sufficiently high data processing speed.

We claim:

1. A transmission/reception device for mobile radio applications for a third or higher generation mobile station, comprising:
   a microprocessor,
   a plurality of task-specific processors, wherein each task-specific processor can be configured such that a basic function performed by the task-specific processor can be controlled by changing configuration parameters, where, following configuration, the task-specific processor performs data processing in line with a function determined by the configuration,
   a bidirectional processor interface which connects the microprocessor and the plurality of task-specific processors to one another via a first bus,
   wherein the first bus connects the processor interface associated with the microprocessor with the task-specific processors, and
   a second bus, which connects the microprocessor and at least one of the task-specific processors to one another for the purpose of data interchange, wherein
   the microprocessor has an associated configuration table and the entries in the configuration table comprise control data which are calculated beforehand in a task-specific processor and are transferred to the microprocessor via the processor interface,
   the microprocessor ascertains the configuration instructions for a task-specific processor by evaluating the control data in the configuration table,
   the microprocessor is designed to configure the task-specific processors by transmitting suitable configuration instructions via the processor interface, and
   the first bus is provided for transferring the configuration instructions and the control data.

2. The transmission/reception device as claimed in claim 1, wherein
   the second bus connects the microprocessor, the plurality of task-specific processors and also at least one data storage means in the transmission/reception device to one another for the purpose of data interchange.

3. The transmission/reception device as claimed in claim 2, wherein
   further hardware modules and/or external interfaces for the transmission/reception device are connected to the second bus.

4. The transmission/reception device as claimed in claim 2, wherein the plurality of task-specific processors can be connected to the second bus via a configurable interface, and a configuration instruction transferred via the processor interface by the microprocessor can be used to assign the configurable interface to a particular task-specific processor or to a submodule thereof.

5. The transmission/reception device as claimed in claim 3, wherein the plurality of task-specific processors can be connected to the second bus via a configurable interface, and a configuration instruction transferred via the processor interface by the microprocessor can be used to assign the configurable interface to a particular task-specific processor or to a submodule thereof.

6. The transmission/reception device as claimed in claim 1, wherein a first task-specific processor is a RAKE data processing circuit.

7. The transmission/reception device as claimed in claim 6, wherein the configuration parameters for the RAKE data processing circuit comprise one or more of the following parameters:

operating state of a RAKE finger,
delay offset of a RAKE finger,
scrambling code identifier for a RAKE finger,
delay offset of the scrambling code for a RAKE finger,
spreading code identifier for a RAKE finger, and
spreading factor for a RAKE finger.

8. The transmission/reception device as claimed in claim 1, wherein a second task-specific processor is a searcher.

9. The transmission/reception device as claimed in claim 8, wherein control data provided by the searcher comprise one or more of the following parameters:

levels of the ascertained signal peaks,
delay offsets of the ascertained signal peaks, and
cell identifiers of the ascertained signal peaks.

10. A method for processing data in a transmission/reception device for mobile radio applications for a third or higher generation mobile station, comprising a microprocessor, a plurality of task-specific processors, wherein each task-specific processor can be configured such that a basic function performed by the task-specific processor can be controlled by changing configuration parameters, and a bidirectional processor interface which connects the microprocessor to the task-specific processor, comprising the steps of:

ascertaining the configuration parameters for a task-specific processor by evaluating control data which have been calculated beforehand in another task-specific processor and have been communicated to the microprocessor, transmitting the configuration instructions and/or control data via a first bus to one task-specific processor, the first bus connecting the processor interface associated with the microprocessor to each task-specific processor, configuring one task-specific processor by transmitting suitable configuration instructions from the microprocessor to one task-specific processor via the processor interface, following configuration of one task-specific processor, instructing the latter to process data in line with a function determined by the configuration, and transmitting further data to be processed from one task-specific processor using a separate second bus, which connects the microprocessor and at least one of the task-specific processors to one another for the purpose of data interchange.

11. The method as claimed in claim 10, wherein a first task-specific processor is a RAKE data processing circuit, and the configuration step comprises the prescription of one or more of the following parameters:

operating state of a RAKE finger,
delay offset of a RAKE finger,
scrambling code identifier for a RAKE finger,
delay offset of the scrambling code for a RAKE finger,
spreading code identifier for a RAKE finger, and
spreading factor for a RAKE finger.

12. The method as claimed in claim 10, wherein a second task-specific processor is a searcher, and comprising the following step:

control data from the searcher are transmitted to the microprocessor, said control data comprising one or more of the following parameters:

levels of the ascertained signal peaks,
delay offsets of the ascertained signal peaks, and
cell identifiers of the ascertained signal peaks.

13. The method as claimed in claim 11, wherein a second task-specific processor is a searcher, and comprising the following step:

control data from the searcher are transmitted to the microprocessor, said control data comprising one or more of the following parameters:

levels of the ascertained signal peaks,
delay offsets of the ascertained signal peaks, and
cell identifiers of the ascertained signal peaks.

14. The method as claimed in claim 10, wherein data are processed in a task-specific processor following configuration thereof using a multiplicity of cycles, particularly using a multiplicity of timeslots or timeframes when taking a transmission system with a timeslot and/or timeframe structure as a basis.

* * * * *